US007698360B2

(12) United States Patent
Rowley et al.

(10) Patent No.: US 7,698,360 B2
(45) Date of Patent: Apr. 13, 2010

(54) SYSTEM AND METHOD FOR DISTANCE LEARNING

(75) Inventors: David D. Rowley, Spanish Fork, UT (US); Sean D. Gale, Pleasant Grove, UT (US); Thomas K. Christensen, Santaquin, UT (US); Jeffrey A. Fischer, Provo, UT (US); Craig R. Jenkins, Orem, UT (US)

(73) Assignee: Novell, Inc., Provo, UT (US)

( * ) Notice: Subject to any disclaimer, the term of this patent is extended or adjusted under 35 U.S.C. 154(b) by 1267 days.

(21) Appl. No.: 10/082,248

(22) Filed: Feb. 26, 2002

(65) Prior Publication Data

US 2003/0182358 A1 Sep. 25, 2003

(51) Int. Cl.
*G06F 15/16* (2006.01)
(52) U.S. Cl. .................... 709/203; 709/217; 709/227
(58) Field of Classification Search ................. 709/203, 709/218, 217, 227; 434/350
See application file for complete search history.

(56) References Cited

U.S. PATENT DOCUMENTS

| 5,310,349 | A | * | 5/1994 | Daniels et al. ............... 434/350 |
| 5,511,217 | A | | 4/1996 | Nakajima et al. ............ 395/800 |
| 5,553,291 | A | * | 9/1996 | Tanaka et al. .................. 718/1 |
| 5,572,694 | A | | 11/1996 | Uchino ........................ 395/406 |
| 5,602,982 | A | | 2/1997 | Judd et al. ................... 395/326 |
| 5,621,912 | A | | 4/1997 | Borruso et al. .............. 395/406 |
| 5,704,791 | A | | 1/1998 | Gillio ........................... 434/262 |
| 5,743,743 | A | | 4/1998 | Ho et al. ...................... 434/236 |
| 5,823,781 | A | * | 10/1998 | Hitchcock et al. ........... 434/118 |

(Continued)

FOREIGN PATENT DOCUMENTS

CA 2378200 1/2001

OTHER PUBLICATIONS

Nieh, Jason, et al., "Examining VMware", *Dr. Dobb's Journal*, vol. 25, No. 8, Aug. 2000, pp. 70, 72-74, and 76.

(Continued)

*Primary Examiner*—William C Vaughn, Jr.
*Assistant Examiner*—Kristie D Shingles
(74) *Attorney, Agent, or Firm*—Pillsbury Winthrop Shaw Pittman LLP (57) ABSTRACT

A system and method for distance learning that can be used to teach a typical IT training course. In one aspect, a student that desires to perform remotely an exercise from an IT training course uses his/her Java-capable browser to connect to a distance learning web server. The web server downloads to the browser a list of exercises that the student can choose from. After the student selects an exercise, the web server launches the virtual machines that are needed for the student to perform the selected exercise. The virtual machines are launched on a computer system that is remote from the student, but the computer system includes a remote display server. After the virtual machines are launched on the remote system, a remote display viewer is loaded in the student's browser and the remote display viewer connects to the remote display server. After the viewer connects to the remote display server, the viewer displays one or more of the virtual machines in a window on the student's computer. Thus, after the viewer connects to the remote display server, the student can remotely interact with the virtual machines that are required for the student to perform the exercise.

20 Claims, 7 Drawing Sheets

U.S. PATENT DOCUMENTS

| | | | |
|---|---|---|---|
| 5,827,070 A | 10/1998 | Kershaw et al. | 434/322 |
| 5,909,545 A | 6/1999 | Frese, II et al. | 395/200.38 |
| 5,953,536 A | 9/1999 | Nowlin, Jr. | 395/750.05 |
| RE36,462 E | 12/1999 | Chang et al. | 711/209 |
| 6,033,226 A | 3/2000 | Bullen | 434/219 |
| 6,064,856 A * | 5/2000 | Lee et al. | 434/350 |
| 6,075,938 A | 6/2000 | Bugnion et al. | 395/500.48 |
| 6,099,320 A | 8/2000 | Papadopoulos | 434/322 |
| 6,135,776 A | 10/2000 | Erturk et al. | 434/276 |
| 6,149,438 A * | 11/2000 | Richard et al. | 434/322 |
| 6,149,441 A * | 11/2000 | Pellegrino et al. | 434/350 |
| 6,157,808 A | 12/2000 | Hollingsworth | 434/350 |
| 6,162,060 A * | 12/2000 | Richard et al. | 434/118 |
| 6,190,178 B1 * | 2/2001 | Oh | 434/323 |
| 6,223,202 B1 * | 4/2001 | Bayeh | 718/102 |
| 6,256,637 B1 * | 7/2001 | Venkatesh et al. | 707/103 Y |
| 6,260,068 B1 | 7/2001 | Zalewski et al. | 709/226 |
| 6,269,409 B1 * | 7/2001 | Solomon | 719/329 |
| 6,301,462 B1 | 10/2001 | Freeman et al. | 434/350 |
| 6,325,631 B1 | 12/2001 | Kouba et al. | 434/219 |
| 6,341,212 B1 * | 1/2002 | Shende et al. | 434/350 |
| 6,341,960 B1 | 1/2002 | Frasson et al. | 434/322 |
| 6,345,311 B1 | 2/2002 | Breslau et al. | 709/310 |
| 6,370,355 B1 * | 4/2002 | Ceretta et al. | 434/350 |
| 6,371,765 B1 | 4/2002 | Wall et al. | 434/224 |
| 6,505,031 B1 * | 1/2003 | Slider et al. | 434/350 |
| 6,514,085 B2 * | 2/2003 | Slattery et al. | 434/335 |
| 6,519,445 B2 * | 2/2003 | Casey-Cholakis et al. | 434/350 |
| 6,546,230 B1 * | 4/2003 | Allison | 434/350 |
| 6,594,466 B1 * | 7/2003 | Harned et al. | 434/350 |
| 6,606,479 B2 * | 8/2003 | Cook et al. | 434/350 |
| 6,622,003 B1 * | 9/2003 | Denious et al. | 434/350 |
| 6,652,283 B1 * | 11/2003 | Van Schaack et al. | 434/236 |
| 6,652,287 B1 * | 11/2003 | Strub et al. | 434/365 |
| 6,674,992 B2 * | 1/2004 | Helmick et al. | 434/362 |
| 6,678,500 B2 * | 1/2004 | Helmick et al. | 434/362 |
| 6,688,891 B1 * | 2/2004 | Sanford | 434/365 |
| 6,704,541 B1 * | 3/2004 | Ciarallo et al. | 434/362 |
| 6,733,295 B2 * | 5/2004 | Stuppy et al. | 434/322 |
| 6,766,311 B1 | 7/2004 | Wall et al. | 706/46 |
| 6,790,045 B1 * | 9/2004 | Drimmer | 434/336 |
| 6,871,043 B2 * | 3/2005 | Sanda | 434/307 R |
| 6,898,411 B2 * | 5/2005 | Ziv-el et al. | 434/350 |
| 6,928,260 B2 * | 8/2005 | Betz et al. | 434/350 |
| 6,941,105 B1 * | 9/2005 | Rowley et al. | 434/350 |
| 6,965,752 B2 * | 11/2005 | Allen et al. | 434/362 |
| 6,988,138 B1 * | 1/2006 | Alcorn et al. | 709/225 |
| 7,013,325 B1 * | 3/2006 | Vivian et al. | 709/203 |
| 7,029,280 B2 * | 4/2006 | Krebs et al. | 434/118 |
| 7,153,140 B2 * | 12/2006 | Ivanir et al. | 434/322 |
| 7,369,808 B2 * | 5/2008 | Wessner et al. | 434/350 |
| 2002/0065926 A1 * | 5/2002 | Hackney et al. | 709/231 |
| 2002/0072049 A1 * | 6/2002 | Prahalad | 434/365 |
| 2002/0082823 A1 | 6/2002 | Traut | 703/27 |
| 2002/0099876 A1 | 7/2002 | Bui et al. | 710/4 |
| 2002/0103882 A1 * | 8/2002 | Johnston et al. | 709/218 |
| 2002/0115049 A1 | 8/2002 | Roschelle et al. | 434/350 |
| 2002/0124127 A1 | 9/2002 | Dawkins et al. | 710/200 |
| 2002/0128806 A1 | 9/2002 | Anderson et al. | 703/2 |
| 2002/0129212 A1 | 9/2002 | Lee et al. | 711/152 |
| 2002/0192623 A1 | 12/2002 | Sather et al. | 434/118 |
| 2002/0194437 A1 | 12/2002 | Kapoor et al. | 711/153 |
| 2003/0014738 A1 | 1/2003 | Dawkins et al. | 717/131 |
| 2003/0028523 A1 | 2/2003 | Brown et al. | 707/3 |
| 2003/0033512 A1 | 2/2003 | Austen et al. | 713/2 |
| 2003/0056155 A1 | 3/2003 | Austen et al. | 714/45 |
| 2003/0061260 A1 | 3/2003 | Rajkumar | 709/104 |
| 2003/0061540 A1 | 3/2003 | Lee et al. | 714/31 |
| 2003/0091968 A1 | 5/2003 | Eggert et al. | 434/262 |

OTHER PUBLICATIONS

"Certified Directory Engineer—Practicum," Novell, www.novell.com/inc/pf/pf.isp, printed Feb. 12, 2002, 5 pages.

"Beyond the Basics: The Excel 2000 Expert Exam," http://certcities.com/certs/mous/exams/story.asp?EditorialsID=16, printed Feb. 28, 2002, 5 pages.

"Project 2000 Core Exam," http://certcities.com/certs/mous/exams/story.asp?EditorialsID=37, printed Feb. 28, 2002, 4 pages.

"MOUS Certification," www.microsoft.com/traincert/mcp/mous/mous.asp, printed Feb. 28, 2002, 2 pages.

"Technical White Paper", VMware, Inc., Feb. 1999, 9 pages.

Munro, Jay, "Virtual Machines & VMware, Part 1", www.extremetech.com/print_article: Dec. 21, 2001, 12 pages.

"VMware Launches Third Generation of Award-Winning Desktop Virtualization Software", www.vmware.com/news/releases/ws3.html, printed Dec. 18, 2001, 3 pages.

"Virtual Network Computing", www.uk.research.att.com/vnc, printed Jan. 4, 2002, 2 pages.

"E-Business Applications; On-The-Net Training", www.internetweek.com/ebizapps01/ebiz043001-2.htm, Apr. 30, 2001, 2 pages.

McCracken, Stuart et al., "Real Laboratories for Distance Education", McGill University, Dept ECE, 10 pages.

Wielbut, Vlad, "World Wide Web Elementary; Technologies for Creating Complex Learning Environments on the Web", www.communitytechnology.org/distance_ed/, May 13, 1998, 8 pages.

Dodge, Bernie, Ph.D., "Distance Learning on the World Wide Web", http://edweb.sdsu.edu/people/bdodge/ctptg/ctptg.html, Last updated Nov. 1, 1995, 17 pages.

"Hands-On Labs", www.handsonlabs.com/Products/products.html, printed Jan. 4, 2002, 1 page.

* cited by examiner

SYSTEM AND METHOD FOR DISTANCE LEARNING

CROSS REFERENCE TO RELATED APPLICATIONS

This application is related to U.S. application Ser. No. 10/060,345, now U.S. Pat. No. 6,941,105, filed on Feb. 1, 2002, which is assigned to the same assignee as that of the present invention and which is incorporated herein by this reference.

BACKGROUND OF THE INVENTION

1. Field of the Invention

The present invention is related to the field of distance learning (or distance education).

2. Discussion of the Background

The concept of distance learning dates back over 100 years. Correspondence courses, one of the earliest forms of distance learning, was in wide spread use at the beginning of the $20^{th}$ century. Students enrolled in such correspondence classes would receive by mail packages containing learning materials and assignments. The students also used the mail to send completed assignments to the instructor.

As communication tools developed, so did the opportunities for distance learning. Radio and television are two technologies that greatly enhanced the distance learning experience. With the advent of the Internet and the World Wide Web (a.k.a., "the web"), many in the teaching community believed that this technology would revolutionize distance learning, giving instructors the tools necessary to more effectively teach at distance.

To some extent, the Internet and the web has revolutionized distance learning. A quick search of the web reveals hundreds of opportunities for distance learning. Distance learning opportunities from learning a foreign language to programming in C++ are all easily available.

However, some courses are not suited well to distance learning. One example of such courses are information technology (IT) training courses. A typical IT training course exercise requires a student to spend time in a "hands-on" lab that is set up with multiple computers (also referred to as "machines"), with each computer being set up with a different operating system.

SUMMARY OF THE INVENTION

The present invention aims to provide an environment where IT technology training courses can successfully be taught through distance learning.

In one aspect the invention combines virtual machine technology, remote display technology, and web technology to create a system for distance learning that can be used to teach a typical IT training course.

In one embodiment, the invention includes a server computer system and a client computer system. The server computer system communicates with the client computer system through a communications network. The server computer system includes the following software: a virtual machine platform for running one or more virtual machines, a remote display server (RDS) for providing remote access to a graphical user interface displayed on server computer system, and a distance learning server (DLS). The client computer system includes the following software: a distance learning client (DLC) and a remote display viewer. In one particular embodiment, the DLS includes a standard web server and other software or scripts, the DLC is a standard web browser, and the remote display viewer is a Java client which runs on any Java-capable browser.

In one aspect, a student that desires to perform remotely an exercise from an IT training course uses his/her browser to connect to the DLS. The DLS downloads to the browser a list of exercises that the student can choose from. After the student selects an exercise, the DLS launches the virtual machines that are needed for the student to perform the selected exercise. The virtual machines are launched on a computer system that is remote from the student, but the computer system includes a remote display server. After the virtual machines are launched on the remote system, a remote display viewer is loaded in the student's browser and the remote display viewer connects to the remote display server. After the viewer connects to the remote display server, the viewer displays one or more of the virtual machines in a window on the student's computer. Thus, after the viewer connects to the remote display server, the student can remotely interact with the virtual machines that are required for the student to perform the exercise.

In another aspect, a method according to one embodiment of the invention includes: transmitting a list of exercises from a server to a client system, whereby the client system displays the list of exercises to a student, and wherein each exercise on the list is associated with one or more virtual machines; receiving at the server data transmitted from the client system, wherein the data indicates that the student selected a particular exercise from the list; launching on a computer system that is remote from the client system and that comprises a remote display server the one or more virtual machines that are associated with the particular exercise; and transmitting data to the client system, wherein the data directs the client system to establish a session with the remote display server, whereby the student is able to use the client system to remotely interact with at least one of the one or more virtual machines after the connection is established.

In another aspect, a system according to one embodiment of the invention includes a first computer system comprising a distance learning front-end server; and two or more second computer systems. Each one of the second computer systems has installed therein a virtual machine platform for allowing virtual machines to run on the second computer system, a virtual machine launcher, and a remote display server.

Advantageously, the distance learning front-end server is operable to: (a) transmit a list of exercises to a client system, whereby the client system displays the list of exercises to a student (each exercise is associated with one or more virtual machines); (b) receive data transmitted from the client system, wherein the data indicates that the student selected a particular exercise from the list; (c) select one of the plurality of second computer systems; (d) transmit to the virtual machine launcher installed on the selected second computer system an exercise identifier that identifies the particular exercise selected by the student, wherein the virtual machine launcher launches the one or more virtual machines that are associated with the particular exercise; and (e) transmit to the client system data that directs the client system to establish a session with the remote display server installed on the selected second computer system. After the connection is established, the student is able to use the client system to remotely interact with at least one of the one or more virtual machines that were launched by the virtual machine launcher.

In another aspect, the present invention provides a computer program product for enabling a student to perform an exercise remotely using a client system. The computer program product is embodied in a computer readable medium (e.g., CD, DVD, floppy disk, hard disk, or other computer readable medium) and includes computer instructions for: (a) transmitting a list of exercises to the client system, whereby the client system displays the list of exercises to the student, and wherein each exercise on the list is associated with one or more virtual machines; (b) receiving data transmitted from the client system, wherein the data indicates that the student selected a particular exercise from the list; (c) launching on a computer system that comprises a remote display server the one or more virtual machines that are associated with the particular exercise; and (d) transmitting data to the client system, wherein the data directs the client system to establish a session with the remote display server, whereby the student is able to use the client system to remotely interact with at least one of the one or more virtual machines after the connection is established.

The above and other features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

While the present invention may be embodied in many different forms, there is described herein in detail an illustrative embodiment with the understanding that the present disclosure is to be considered as an example of the principles of the invention and is not intended to limit the invention to the illustrated embodiment.

Figure 1:
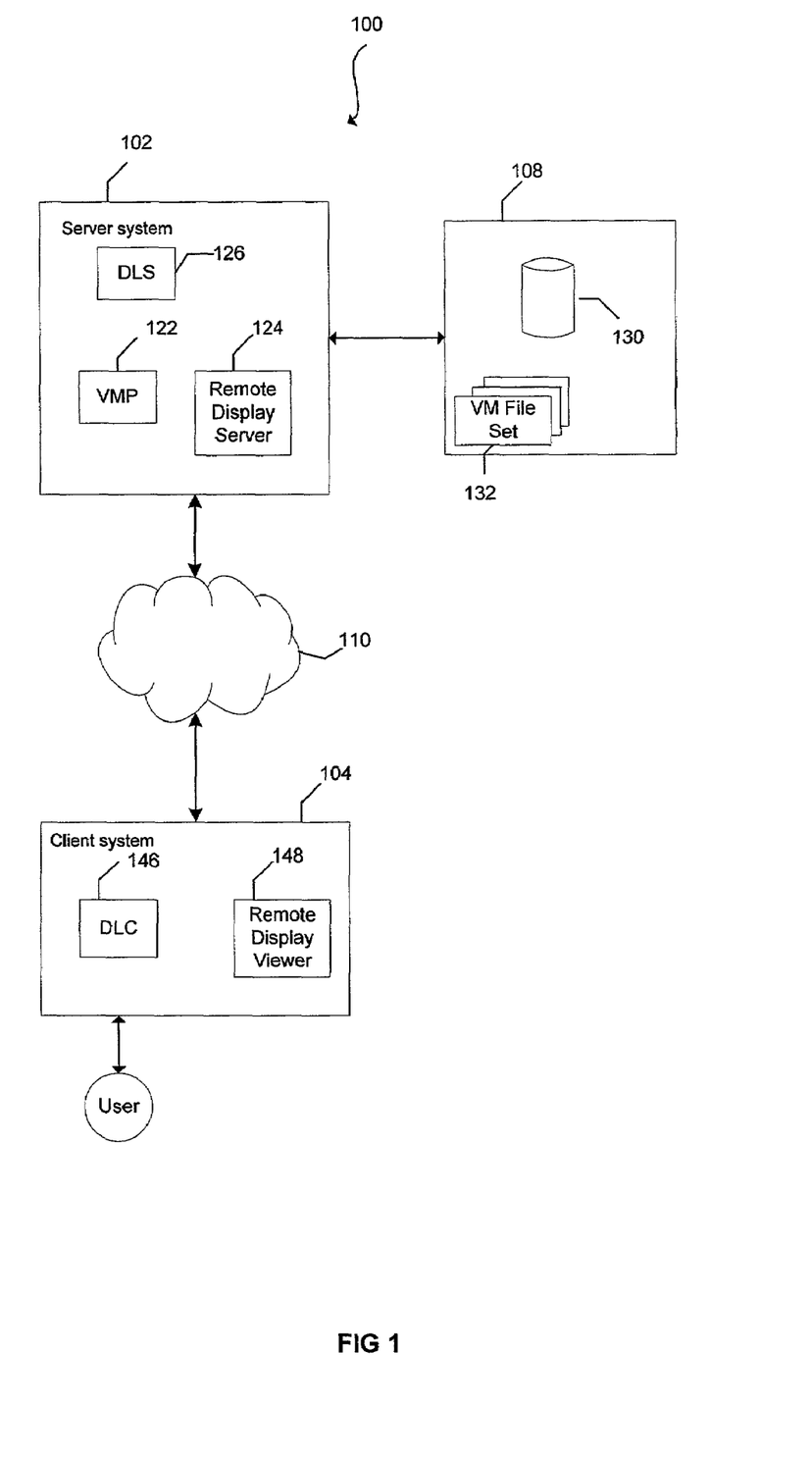
FIG. 1 is a functional block diagram of a system according to one embodiment.

FIG. 1 is a functional block diagram of a system 100 according to one embodiment. System 100 includes a server computer system 102 and a client computer system 104. Server computer system 102 communicates with client computer system 104 through a communications network or link 110.

Server computer system 102 includes the following software: a virtual machine platform 122 for running one or more virtual machines within computer system 102, a remote display server (RDS) 124 for providing remote access to a graphical user interface displayed on server computer system 102, and a distance learning server (DLS) 126. DLS 126 has access to a storage medium 108. Server system 102 may include one or more computers.

Stored on storage medium 108 is a course database 130 and one or more sets of virtual machine files 132. Course database 130 functions to (a) associate usernames and course names, (b) associate each course name with the names of one or more exercises, and (c) associate each exercise name with the names of one or more virtual machines. Each virtual machine is associated with a set of virtual machine files 132. Each set of virtual machines files 132 includes, at the least, a virtual disk file.

Client computer system 104 includes the following software: a distance learning client (DLC) 146 and a remote display viewer (RDV) 148. In one embodiment, DLS 126 includes a standard web server and other software or scripts, DLC 146 is standard Java-capable web browser, and viewer 148 is a Java client which runs on any Java-capable browser. Other browsers and viewers can be used. The invention is not limited to any particular distance learning client or remote display viewer.

A virtual machine platform 122 that can be used with the present invention is VMware Workstation 3.0, which may be purchased or licensed from VMware, Inc., of Palo Alto, Calif. 94304 USA. Other hardware and software configurations may be used. A remote display system that can be used to implement server 124 and viewer 148 is the Virtual Network Computing (VNC) remote display system, which can be obtained from AT&T, Inc. (see e.g., http://www.uk.research.att.com/vnc/.). Other remote display systems may be used.

Figure 2:
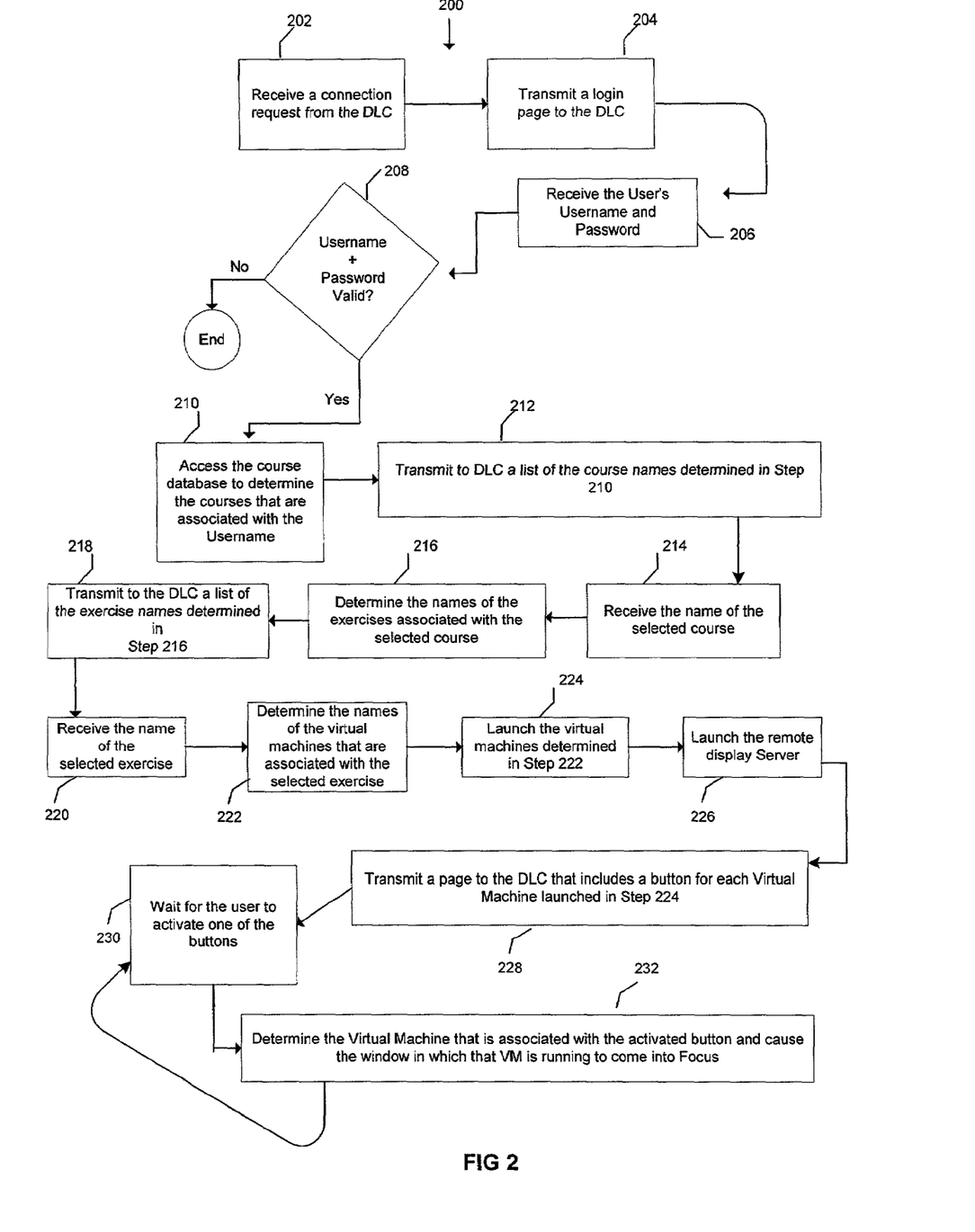
FIG. 2 is a flow chart illustrating a process according to one embodiment.

FIG. 2 is a flow chart illustrating a process 200 performed by DLS 126 in the embodiment where DLC 146 is a Java-capable web browser and viewer 148 is a Java application. Process 200 begins in step 202, where DLS 126 receives a connection request from DLC 146. After receiving the connection request, DLS 126 transmits a login page to DLC 146, which displays the login page to a user 101 (step 204). User 101 enters his/her username and password into the appropriate field on the login page and then DLC 146 transmits the username and password to DLS 126. In step 206, DLS 126 receives the username and password. In step 208, DLS 126 determines whether the username and password combination are valid. If they are not valid the process ends, otherwise control passes to step 210.

In step 210, DLS 126 accesses course database 130 to determine the courses with which the username entered by user 101 is associated. User 101 may be enrolled in one or more courses, in which case, user 101's username is associated with the courses in which user 101 is enrolled. In step 212, DLS 126 transmits to DLC 146 a page containing a list of the names of the courses determined in step 210. DLC 146 receives the page and displays it to user 101. User 101 can select any one of the listed course names. In response to user 101 selecting a course name, DLC 146 transmits the course name to DLS 126. In step 214, DLS 126 receives from DLC 146 the selected course name. In step 216, DLS 126 accesses course database 130 to determine the names of the exercises that are associated in the database with the course name.

In step 218, DLS 126 transmits to DLC 146 a page containing a list of the exercise names determined in step 216. DLC 146 receives the page and displays it to user 101. User 101 can select any one of the listed exercise names. In response to user 101 selecting an exercise, DLC 146 transmits the exercise name to DLS 126. In step 220, DLS 126 receives from DLC 146 the selected exercise name. In step 222, DLS 126 accesses course database 130 to determine the names of the virtual machines that are associated in the database with the selected exercise name.

In step 224, DLS 126 launches the virtual machines identified by the virtual machine names determined in step 222. Each one of the virtual machines has an operating system that produces a user interface. For each virtual machine launched in step 224, virtual machine platform 122 creates a window that displays the user interface produced by the virtual machine's operating system. In step 226, DLS 126 launches remote display server 124. In step 228, DLS 126 transmits a page to DLC 146 that includes a selectable icon or link (e.g., a selectable button) for each virtual machine that was launched in step 224 and that causes DLC 146 to load viewer 148. After viewer 148 is loaded, viewer 148 establishes a session with remote display server 124. Once the session with remote display server 124 is established, viewer 148 and remote display server 124 cooperate so that viewer 148 displays to user 101 the window that is currently in focus on server system 102. When viewer 148 displays the window that is currently in focus on server system 102, user 101 can interact with (e.g., issue commands to) the application (e.g, the virtual machine) that is running in that window, and thereby perform tasks required by the user selected exercise.

In step 230, DLS 126 waits for user 101 to select one of the buttons included in the page transmitted in step 228. When user 101 activates one of the buttons, DLC 146 transmits to DLS 126 a message that indicates which button was activated. In step 232, DLS 126 determines the virtual machine that is associated with the activated button and causes the window in which that virtual machine is running to come into focus. After this window comes into focus, viewer 148 displays the window to user 101 so that user can interact with the virtual machine running in the window. In this way, user 101 can remotely access one or more virtual machines, and, thereby, complete all of the tasks required by the selected exercise. After step 232, control passes back to step 230.

Figure 3:
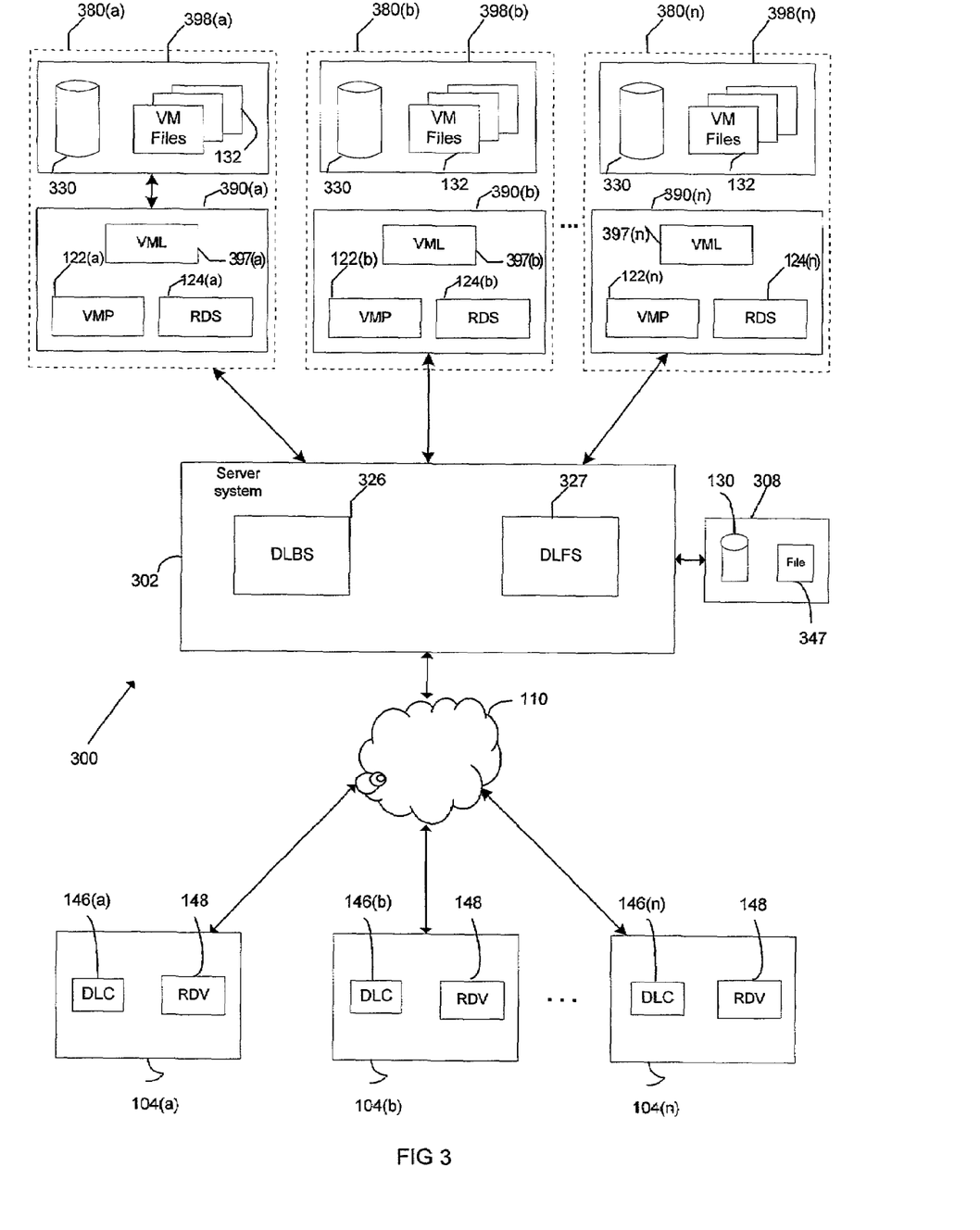
FIG. 3 is a functional block diagram of a system according to another embodiment.

FIG. 3 is a functional block diagram of a system 300 according to another embodiment of the present invention. System 300 includes a server computer system 302, one or more client computer systems 104(a), 104(b), . . . , 104(n), and computing systems 380(a), 380(b) . . . 380(n). Server computer system 302 includes the following software: a distance learning back-end server (DLBS) 326 and a distance learning front-end server (DLFS) 327.

Each computer system 380 includes a computer 390 and a storage medium 398. Each computer 390(a), 390(b), . . . , 390(n) includes the following software: a virtual machine platform 122 for running one or more virtual machines within computer 390, a remote display server 124 for providing remote access to a graphical user interface displayed on computer 390, and a virtual machine launcher (VML) 397. Each storage medium 398(a), 398(b), . . . , 398(n) stores a database 330 and one or more sets of virtual machine files 132.

Figure 4:
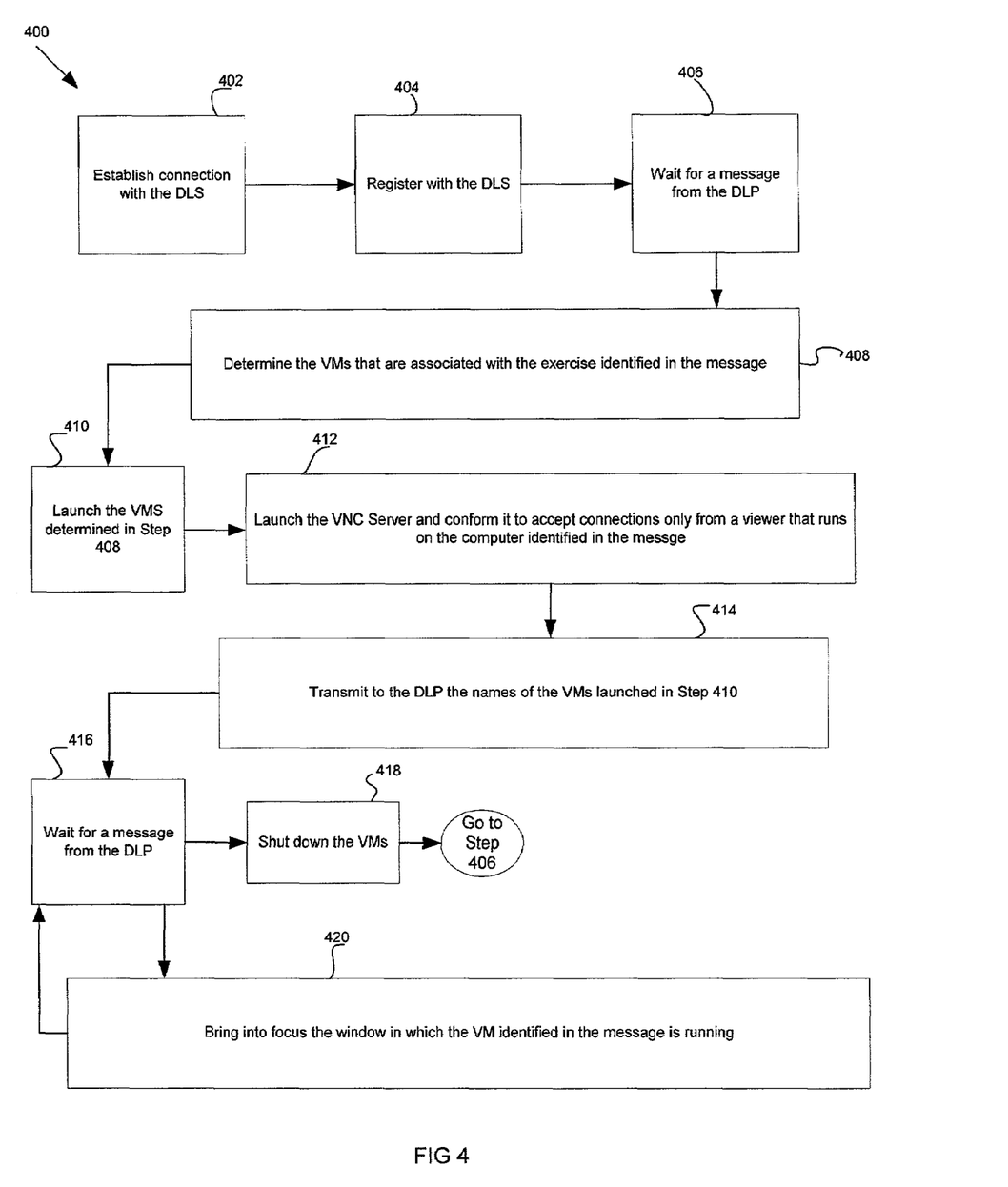
FIG. 4 is a flow chart illustrating a process that is performed by a virtual machine launcher according to one embodiment.

FIG. 4 is a flow chart illustrating a process 400 performed by a VML 397, such as VML 397(a). Process 400 begins in step 402, where VML 397(a) establishes a connection with DLBS 326. In one embodiment, the connection is a persistent connection. After establishing the connection with DLBS 326, VML 397(a) registers itself with DLBS 326. That is, VML 397(a) transmits its configuration information and course information to DLBS 326 (step 404). The configuration information may include an identifier that uniquely identifies the VML 397(a) and may include the port number at which remote display server 124(a) listens for incoming connections. The course information may include the list of courses that are installed on computer 390(a). If a course is installed on computer 390(a), then course information concerning the course is stored in course database 330(a). Thus, VML 397(a) determines the courses that are installed on computer 390(a) by searching database 330(a).

In step 406, VML 397(a) waits to receive from DLFS 327 a message that indicates that a user has selected a course exercise. The message may include the name of the exercise and the name of the course to which the exercise belongs. The message may also include an identifier (e.g., an IP address or other identifier) that identifies the computer that the user is currently using.

After receiving the message, VML 397(a) determines the virtual machines that are associated with the exercise identified in the message (step 408). Each course exercise is associated with one or more virtual machines. This information is stored in database 330(a). Thus, when VML 397(a) receives the message from DLFS 327, VML 397(a) queries database 330(a) for the names of the virtual machines that are associated with the identified exercise. After determining the virtual machines that are associated with the identified exercise, VML 397(a) launches the virtual machines (step 410). Thus, at this step, one or more virtual machines are running on computer 390(a).

In step 412, VML 397(a) launches remote display server 124(a) (if it is not already running) and configures remote display server 124(a) to accept connections only from a viewer 148 that runs on the computer that was identified in the message received in step 406. After remote display server 124(a) accepts a connection from the remote display viewer 148 that runs on the computer identified in the message, the user of the computer can remotely access the virtual machines that were launched in step 410. In this way, the user can perform the exercise remotely. That is, even though the exercise requires the user to interact with multiple machines, the user need not physically go to a classroom lab to perform the exercise: the user can perform the exercise from practically anywhere.

In step 414, VML 397(a) transmits to DLFS 327 the names of the virtual machines associated with the identified exercise. In step 416, VML 397(a) waits for a message from DLFS 327. The message contains an indication that the user has finished the exercise or it contains an identifier that identifies one of the virtual machines that were launched in step 410. If the message contains an indication that the user has finished the exercise, then control passes to step 418, otherwise control passes to step 420.

In step 418, VML 397(a) shuts down the virtual machines that it launched in step 410. After step 418, control passes back to step 406. In step 420, VML 397(a) brings into focus the window in which the identified virtual machine is running. This causes remote display server 124(a) to transmit the window information to the user's remote display viewer, thereby enabling the user to remotely access the virtual machine that is running in the window. After step 420, control passes back to step 416.

Figure 5:
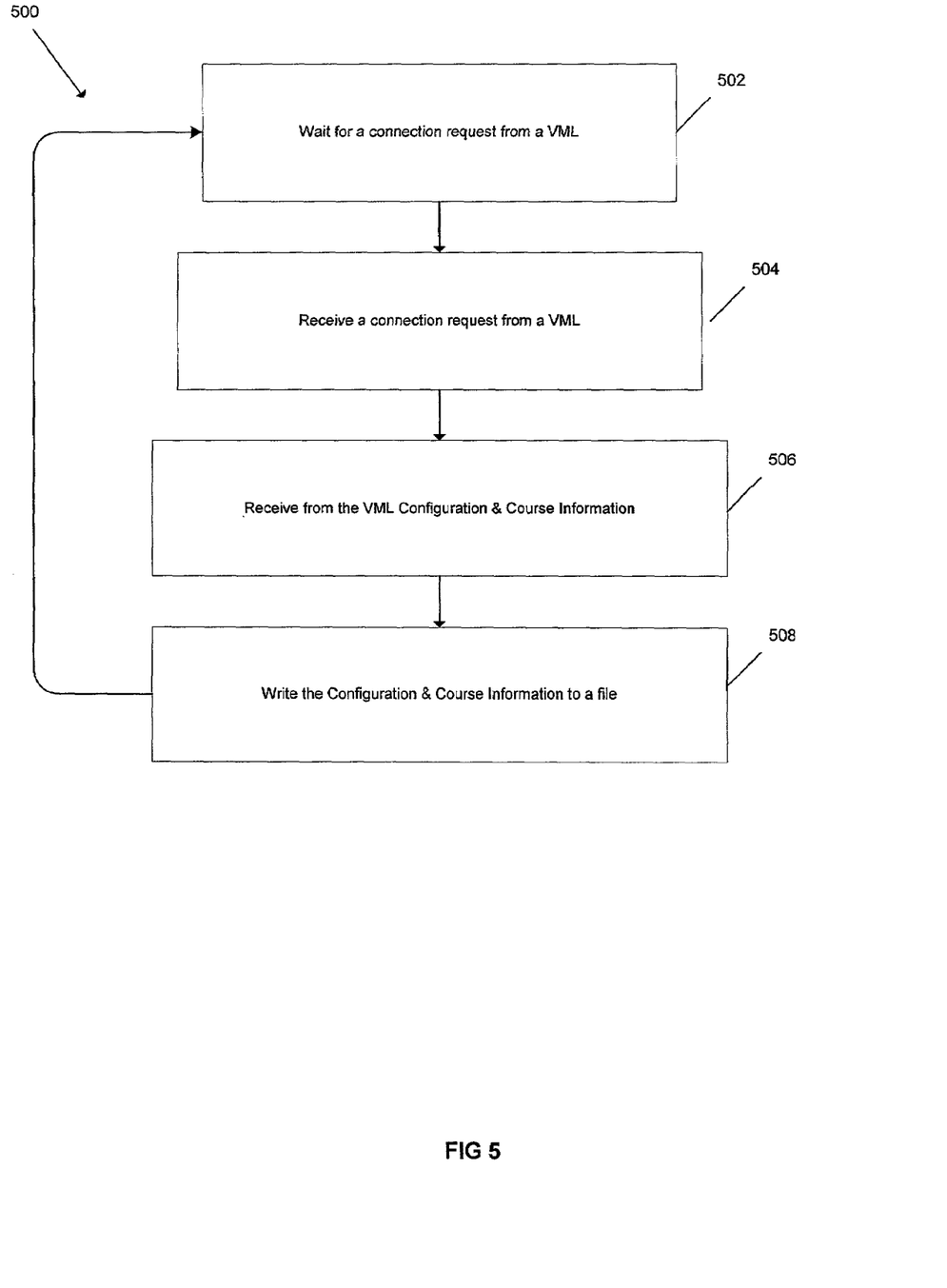
FIG. 5 is a flow chart illustrating a process that is performed by a distance learning back-end server according to one embodiment.

FIG. 5 is a flow chart illustrating a process 500 performed by DLBS 326. Process 500 begins in step 502, where DLBS 326 waits for a connection request from a VML 397. In step 504, DLBS 326 receives a connection request from a VML 397. After the connection with the VML 397 is established, DLBS 326 receives from the VML 397 configuration information and course information (step 506). The configuration information may include an identifier that uniquely identifies the VML 397 and may include the port number at which remote display server 124 listens for incoming connections. The course information may include the list of courses that are installed on the computer 390 on which VML 397 is installed. In step 508, the configuration and course information received in step 506 is written to a file 347 stored on storage medium 308. After step 508, control passes back to step 502.

Figure 6A:
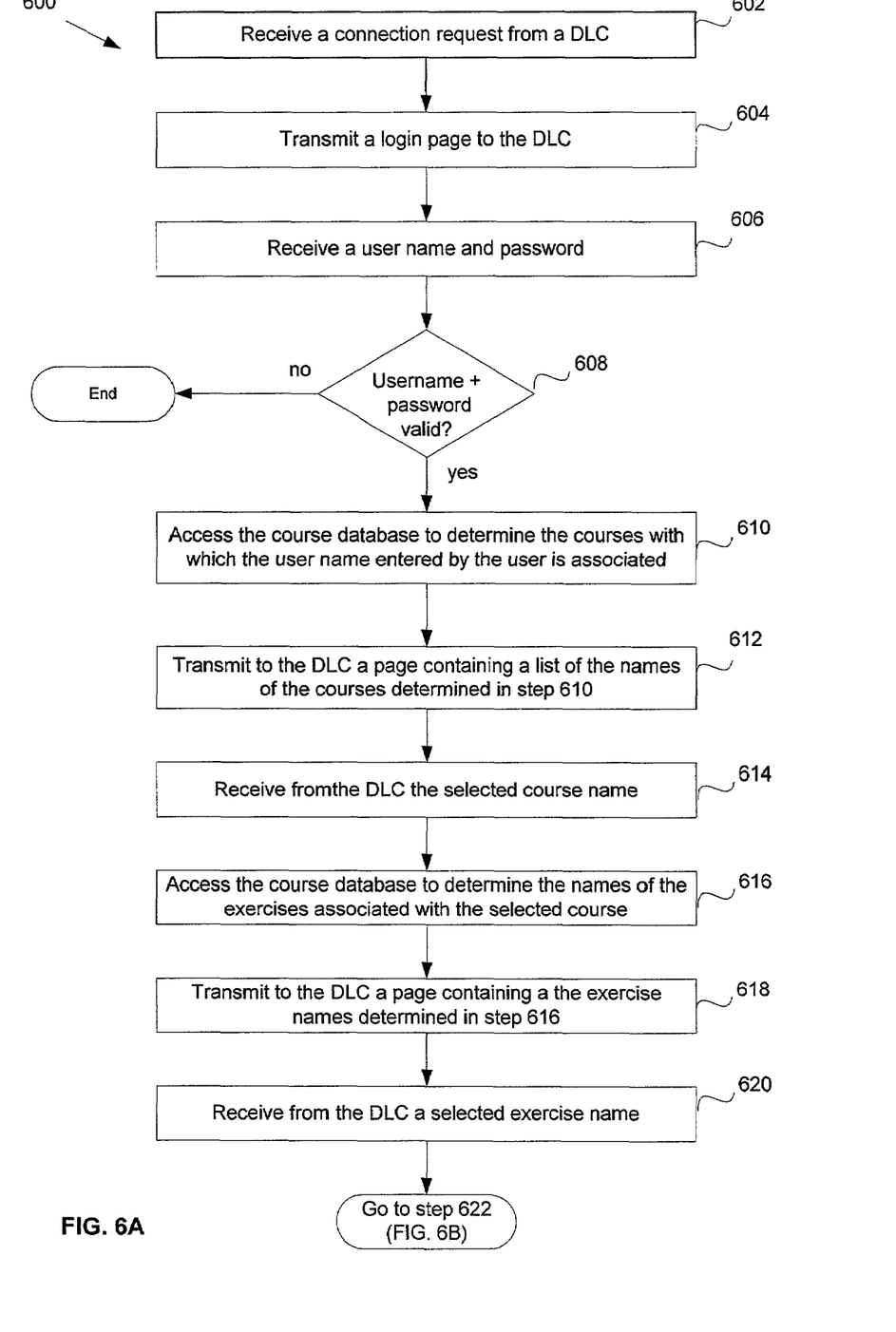
FIG. 6 is a flow chart illustrating a process that is performed by a distance learning front-end server according to one embodiment.
Figure 6B:
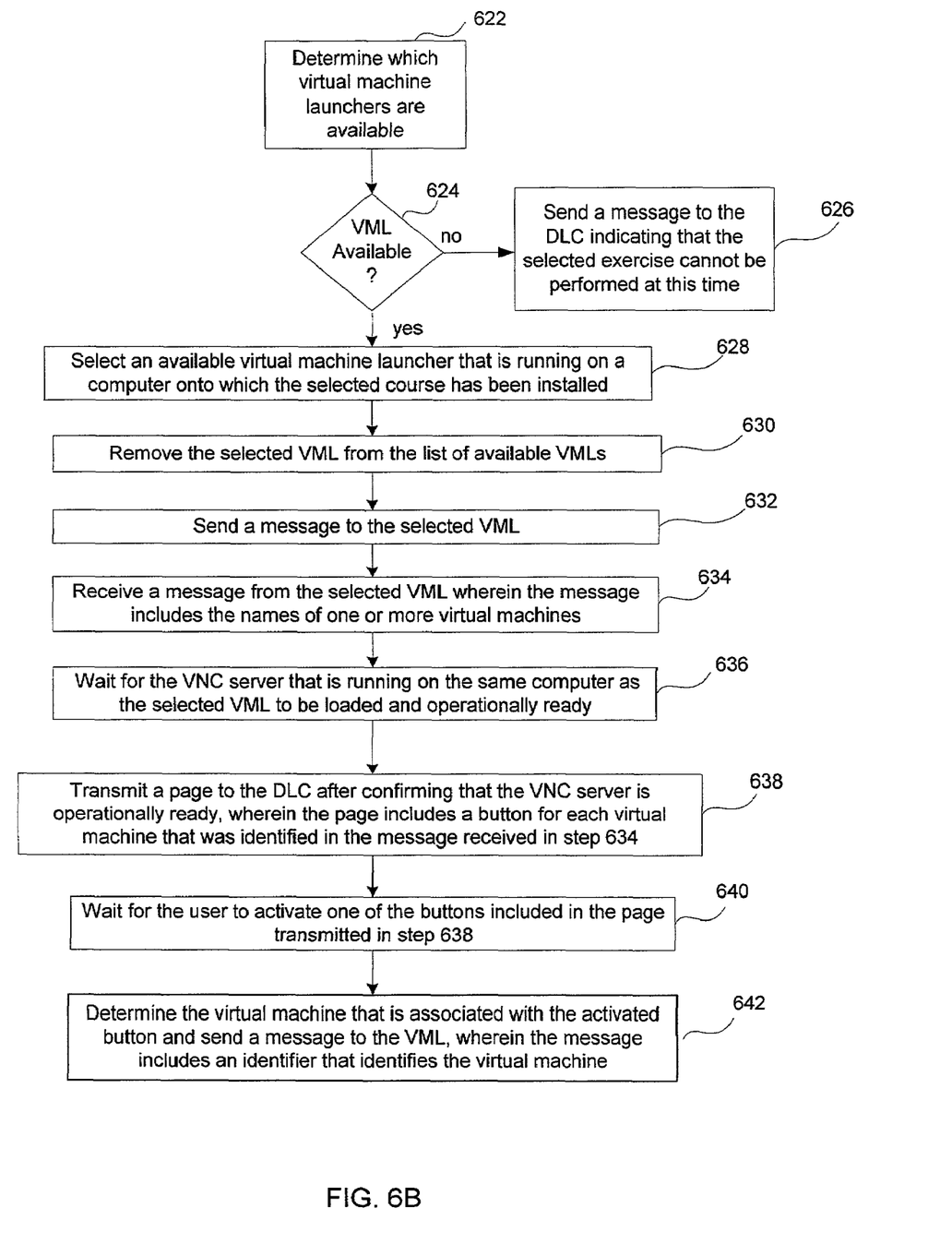

FIG. 6 is a flow chart illustrating a process 600 performed by DLFS 327. Process 600 begins in step 602, where DLFS 327 receives a connection request from one of the DLCs 146(a), 146(b) . . . , 146(n). After receiving the connection request, DLFS 327 transmits a login page to the DLC 146, which displays the login page to a user 101 (step 604). User 101 enters his/her username and password into the appropriate field on the login in page and then the DLC 146 transmits the username and password to DLFS 327. In step 606, DLFS 327 receives the username and password. In step 608, DLFS 327 determines whether the username and password combination are valid. If they are not valid the process ends, otherwise control passes to step 610.

In step 610, DLFS 327 accesses course database 130 to determine the courses with which the username entered by user 101 is associated. User 101 may be enrolled in one or more courses, in which case, user 101's username is associated with the courses in which user 101 is enrolled. In step 612, DLFS 327 transmits to the DLC 146 a page containing a list of the names of the courses determined in step 610. The DLC 146 receives the page and displays it to user 101. User 101 can select any one of the listed course names. In response to user 101 selecting a course name, the DLC 146 transmits the course name to DLFS 327. In step 614, DLFS 327 receives from the DLC 146 the selected course name. In step 616, DLFS 327 accesses course database 130 to determine the names of the exercises that are associated in the database with the course name.

In step 618, DLBS 326 transmits to the DLC 146 a page containing a list of the exercise names determined in step 616. The DLC 146 receives the page and displays it to user 101. User 101 can select any one of the listed exercise names. In response to user 101 selecting an exercise, the DLC 146 transmits the exercise name to DLFS 327. In step 620, DLFS 327 receives from the DLC 146 the selected exercise name.

In step 622, DLFS 327 determines which of the VMLs 397(a),(b) . . . (n) are available. For example, in one embodiment, a list of the available VMLs 397 is maintained, and, in this embodiment, DLFS 327 examines the list of available VMLs 397 to determine the VMLs that are available. In step 624, DLFS 327 examines file 347 to determine whether there exists an available VML 397 that is running on a computer 390 onto which the selected course has been installed. If there does not exist such an available VML 397, control passes to step 626, otherwise control passes to step 628.

In step 626, DLFS 327 sends a message to the DLC 146 indicating that the selected exercise cannot be performed at this time. Upon receiving the message, the DLC 146 displays the message to the user.

In step 628, DLFS 327 selects an available VML 397 that is running on a computer 390 onto which the selected course has been installed. In step 630, DLFS 327 removes the selected VML 397 from the list of available VMLs. In step 632, DLFS 327 launches the virtual machines associated with the selected exercise by sending a message to the selected VML 397. The message indicates that a user 101 has selected a course exercise. The message may include the name of exercise and the name of the course to which the exercise belongs. The message may also include an identifier that identifies the computer that the user 101 is currently using. After receiving the message from DLFS 327, the VML 397 determines the one or more virtual machines that are associated with the exercise identified in the message and launches those virtual machines.

In step 634, DLFS 327 receives a message from the selected VML 397. The message includes the names of the one or more virtual machines that were launched by the VML 397 in response to the message sent in step 632. In step 636, DLFS 327 waits for the remote display server 124 that is running on the same computer as the selected VML 397 to be loaded and operationally ready. After DLFS 327 confirms that the remote display server 124 is operationally ready, DLFS 327 transmits a page to the DLC 146 (step 638). The page includes a button for each virtual machine that was identified in the message received in step 634. The page also includes code that causes the DLC 146 to load viewer 148 and causes viewer 148 to establish a session with the remote display server 124.

Once the session with the remote display server 124 is established, viewer 148 and the remote display server 124 cooperate so that viewer 148 displays to user 101 the window that is currently in focus on computer 390. When viewer 148 displays the window that is currently in focus on computer 390, user 101 can interact with the virtual machine that is running in that window, and thereby perform tasks required by the selected exercise.

In step 640, DLFS 327 waits for user 101 to activate one of the buttons included in the page transmitted in step 638. When user 101 activates one of the buttons, the DLC 146 transmits to DLFS 327 a message that indicates which button was activated. In step 642, DLFS 327 determines the virtual machine that is associated with the activated button and sends a message to VML 397. The message includes an identifier that identifies the virtual machine that that is associated with the activated button. After receiving the message, VML 397 brings into focus the window in which the identified virtual machine is running. After this window comes into focus, viewer 148 displays the window to user 101 so that user can interact with the virtual machine running in the window. In this way, user 101 can remotely access one or more virtual machines, and, thereby, complete all of the tasks required by the selected exercise. After step 642, control passes back to step 640.

While the processes illustrated herein may be described as a series of consecutive steps, none of these processes are limited to any particular order of the described steps. Additionally, it should be understood that the various illustrative embodiments of the present invention described above have been presented by way of example only, and not limitation. Thus, the breadth and scope of the present invention should not be limited by any of the above-described exemplary embodiments, but should be defined only in accordance with the following claims and their equivalents.

What is claimed is:

1. A computer implemented method for enabling a plurality of users at a plurality of respective client systems to remotely perform one or more respective exercises using the plurality of respective client systems, the method comprising:

storing in a course database course information including a list of exercises, and for a given exercise one or more virtual machines associated with the exercise;

receiving a request to connect to a remote system from at least one user;

accessing, by the remote system, the course database to determine one or more courses associated with the user;

transmitting, by the remote system, a list of the courses associated with the user to the respective client system associated with the user;

receiving, by the remote system, a selection of at least one of the courses in the course list from the user;

accessing, by the remote system, the course database to determine one or more exercises associated with the selected course;

transmitting, by the remote system, a list of the exercises associated with the selected course to the respective client system associated with the user;

receiving, by the remote system, a selection of at least one of the exercises in the transmitted exercise list from the user;

accessing, by the remote system, the course database to determine at least one virtual machine associated with the selected exercise;

launching, by the remote system, the virtual machine associated with the selected exercise, wherein the launched virtual machine generates a user interface for performing the selected exercise; and transmitting, by the remote system, a view of the user interface to the respective client system associated with the user, wherein the user performs the selected exercise by remotely interacting with the virtual machine via the view of the user interface.

2. The method of claim 1, wherein the client system comprises a web browser and a viewer application for displaying the view of the user interface.

3. The method of claim 1, further comprising:

transmitting, by the remote system, a page to the client system, the page including at least one selectable user interface element associated with the launched virtual machine; and receiving a selection of the at least one user interface element from the user.

4. The method of claim 3, further comprising generating the view of the user interface in response to receiving the selection of the user interface element.

5. The method of claim 1, further comprising launching a remote display server to handle a session with a viewer application at the client system, the viewer application displaying the view of the user interface to the user, the remote display server refreshing the view in response to the user interacting with the view of the user interface during the session.

6. A computer implemented method for enabling a plurality of students at a plurality of respective client systems to remotely perform one or more respective exercises using the plurality of respective client systems, the method comprising:

storing in a course database associated with a remote system course information including a list of exercises, and for a given exercise one or more virtual machines associated with the exercise;

accessing, by the remote system, the course database to determine one or more courses associated with at least one student;

displaying for the student, at the respective client system associated with the student, a list of the courses associated with the student;

upon receiving a selection of at least one of the displayed courses from the student, displaying for the student, at the respective client system associated with the student, a list of exercises associated with the selected course; and upon receiving a selection of at least one of the displayed exercises from the student, launching, by the remote system, at least one virtual machine associated with the selected exercise, wherein the launched virtual machine generates a user interface for performing the selected exercise; and displaying for the student, at the respective client system associated with the student, a view of the user interface, wherein the student performs the selected exercise by remotely interacting with the virtual machine via the view of the user interface.

7. The method of claim 6, further comprising displaying for the student a page including one or more selectable user interface elements associated with the launched virtual machine.

8. The method of claim 7, further comprising upon receiving a selection of at least one of the displayed user interface elements from the student, generating the view of the user interface.

9. The method of claim 6, further comprising launching a remote display server to handle a session with a viewer application at the client system, the viewer application displaying for the student the view of the user interface, the remote display server refreshing the view in response to the student interacting with the view of the user interface during the session.

10. A system for enabling a plurality of students at a plurality of respective client systems to remotely perform one or more respective exercises using the plurality of respective client systems, each of the plurality of respective client systems having a respective web browser and a respective viewer application, the system comprising:

a server remote from the plurality of respective client systems;

a plurality of computer systems coupled to the remote server, each computer system associated with at least one course and comprising:

a virtual machine platform for running virtual machines, a virtual machine launcher for launching the virtual machines on the virtual machine platform, and a remote display server for handling sessions between the virtual machines and the plurality of respective client systems; and a course database that stores course information including a list of exercises, and for a given exercise one or more virtual machines associated with the exercise, the course database coupled to the remote server, wherein the system is operable to:

access the course database to determine one or more courses associated with at least one student;

transmit a list of the courses associated with the student to the respective client system associated with the student;

receive a selection of at least one of the courses in the course list from the respective client system associated with the student;

transmit a list of exercises associated with the selected course to the respective client system associated with the student;

receive a selection of at least one of the exercises in the transmitted exercise list from the respective client system associated with the student;

select one of the plurality of computer systems based on the selected course;

invoke the virtual machine launcher at the selected computer system to launch at least one virtual machine associated with the selected exercise, wherein the launched virtual machine runs on the virtual machine platform at the selected computer system and generates a user interface for performing the selected exercise; and launch the remote display server at the selected computer system to handle a session with the respective client system associated with the student, wherein the remote display server is operable to transmit views of the user interface to the respective viewer application at the respective client system during the session, the respective viewer application displaying the view of the user interface to the student, wherein the student performs the selected exercise by remotely interacting with the virtual machine during the session via the views of the user interface.

11. The system of claim 10, wherein the virtual machine launcher runs on the selected computer system onto which the selected course is installed.

12. The system of claim 10, wherein the system is further operable to access the course database to determine the virtual machine associated with the selected exercise.

13. The system of claim 10, wherein the remote display server at the selected computer system is further operable to transmit a page to the respective client system, the page including at least one selectable user interface element associated with the launched virtual machine.

14. The system of claim 13, wherein the remote display server at the selected computer system is further operable to:
receive a selection of the at least one user interface element from the student;
generate a view of the user interface in response to receiving the selection of the user interface element; and
refresh the view in response to the student interacting with the view of the user interface during the session.

15. The system of claim 10, wherein the virtual machine launcher is operable to register configuration information and the course information with the course database, the configuration information including a unique identifier for the virtual machine launcher and a port number for the remote display server to accept session connections, the course information further including a list of courses associated with the virtual machine launcher.

16. A computer readable medium for enabling a plurality of users at a plurality of respective client systems to remotely perform one or more respective exercises using the plurality of respective client systems, the computer readable medium comprising computer-executable instructions for:
storing in a course database course information including a list of exercises, and for a given exercise one or more virtual machines associated with the exercise;
receiving a request to connect to a remote system from at least one user;
accessing, by the remote system, the course database to determine one or more courses associated with the user;
transmitting, by the remote system, a list of the courses associated with the user to the respective client system associated with the user;
receiving, by the remote system, a selection of at least one of the courses in the course list from the user;
accessing, by the remote system, the course database to determine one or more exercises associated with the selected course;
transmitting, by the remote system, a list of the exercises associated with the selected course to the respective client system associated with the user;
receiving, by the remote system, a selection of at least one of the exercises in the transmitted exercise list from the user;
accessing, by the remote system, the course database to determine at least one virtual machine associated with the selected exercise;
launching, by the remote system, the virtual machine associated with the selected exercise, wherein the launched virtual machine generates a user interface for performing the selected exercise; and
transmitting, by the remote system, a view of the user interface to the respective client system associated with the user, wherein the user performs the selected exercise by remotely interacting with the virtual machine via the view of the user interface.

17. The computer readable medium of claim 16, further comprising computer-executable instructions for:
transmitting, by the remote system, a page to the client system, the page including at least one selectable user interface element associated with the launched virtual machine; and
receiving a selection of the at least one user interface element from the user.

18. The computer readable medium of claim 17, further comprising computer-executable instructions for generating the view of the user interface in response to receiving the selection of the user interface element.

19. The method of claim 16, further comprising computer-executable instructions for launching a remote display .server to handle a session with a viewer application at the client system, the viewer application displaying the view of the user interface to the user, the remote display server refreshing the view in response to the user interacting with the view of the user interface during the session.

20. A computer implemented method for enabling a plurality of users at a plurality of respective client systems to remotely perform one or more respective exercises using the plurality of respective client systems, the method comprising:
storing in a course database course information including a list of exercises, and for a given exercise one or more virtual machines associated with the exercise;
receiving a request to connect to a remote system from at least one user;
accessing, by the remote system, the course database to determine one or more courses associated with the user;
transmitting, by the remote system, a list of the courses associated with the user to the respective client system associated with the user;
receiving, by the remote system, a selection of at least one of the courses in the course list from the user;
accessing, by the remote system, the course database to determine one or more exercises associated with the selected course;
transmitting, by the remote system, a list of the exercises associated with the selected course to the respective client system associated with the user;
receiving, by the remote system, a selection of at least one of the exercises in the transmitted exercise list from the user;
selecting, by the remote system, at least one available virtual machine launcher associated with the selected course, wherein the selected virtual machine launcher is running on a computer onto which the selected course is installed, the computer being associated with remote system;
transmitting, by the remote system, a message including at least one identifier that identifies the selected exercise to the selected virtual machine launcher, wherein the selected virtual machine launcher is operable to:
access the course database to determine at least one virtual machine associated with the selected exercise; and
launch the virtual machine associated with the selected exercise, wherein the launched virtual machine generates a user interface for performing the selected exercise; and
transmitting, by the remote system, a view of the user interface to the respective client system associated with the user, wherein the user performs the selected exercise by remotely interacting with the virtual machine via the view of the user interface.

* * * * *